INVENTOR.
FRANCIS M. ROGALLO
BY
ATTORNEYS

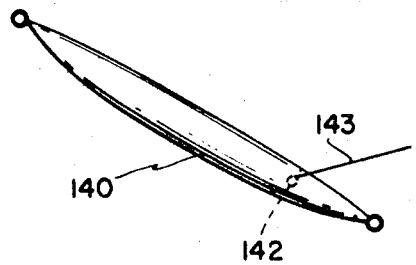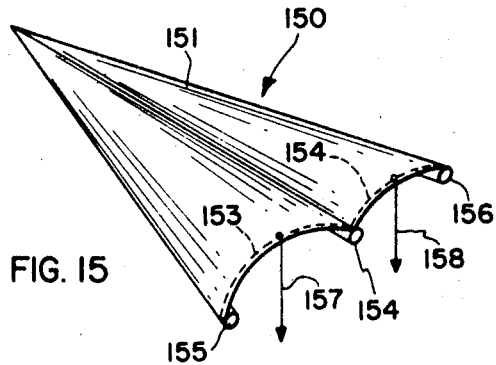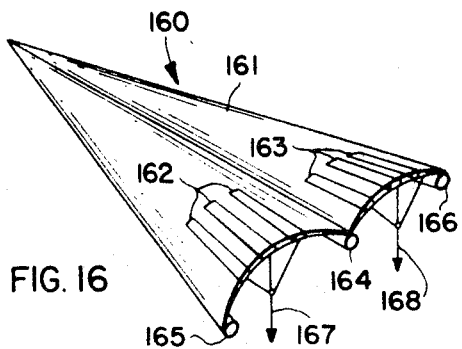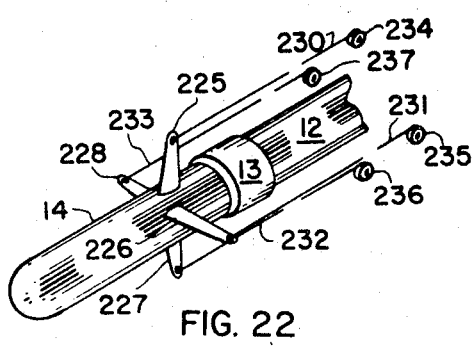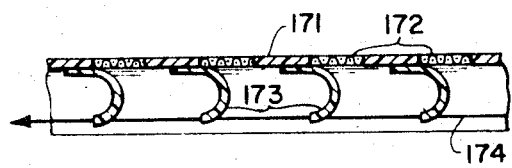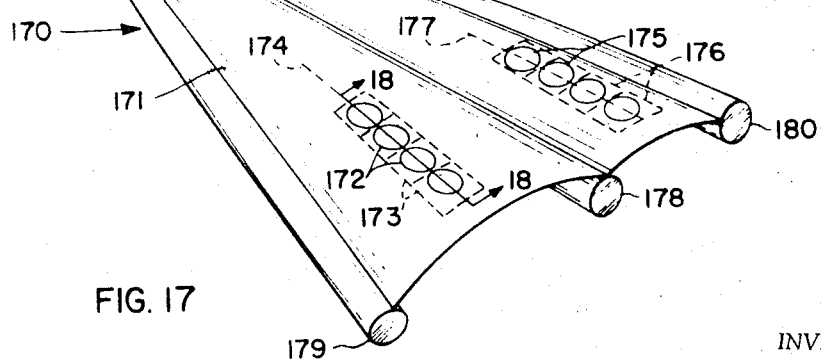

Jan. 21, 1969     F. M. ROGALLO     3,423,049
CONTROL DEVICES FOR FLEXIBLE WING AIRCRAFT
Original Filed Jan. 17, 1964     Sheet 4 of 4

INVENTOR.
FRANCIS M. ROGALLO
BY
ATTORNEYS

United States Patent Office 3,423,049
Patented Jan. 21, 1969

3,423,049
CONTROL DEVICES FOR FLEXIBLE WING
AIRCRAFT
Francis M. Rogallo, 17 Milford Road,
Newport News, Va. 23601
Original application Jan. 17, 1964, Ser. No. 338,537.
Divided and this application Sept. 1, 1967, Ser.
No. 670,001
U.S. Cl. 244—43            3 Claims
Int. Cl. B64c *3/54, 3/38;* B65d *19/00*

ABSTRACT OF THE DISCLOSURE

This is a control device for a flexible wing aircraft. The flexible wing aircraft has a triangular-shaped superstructure which includes a central keel member and angularly directed leading edge members connected to the apex of the keel. A flexible membrane-like material is fixed to the keel and leading edge members to form wing panels and a lift surface. The leading edge members are hinged at the apex of the keel. The leading edge members are moved symmetrically or asymmetrically by a motivation mechanism to change the wing planform and thereby control the flight of the vehicle.

SPECIFICATION

This application is a division of application Ser. No. 338,537, filed Jan. 17, 1964.

The invention described herein may be manufactured and used by or for the Government of the United States of America for governmental purposes without the payment of any royalties thereon or therefor.

This invention relates to control devices for flexible wing air vehicles, and more particularly to control devices for flexible wing vehicles wherein the wing configuration is altered to provide control.

Due to the increased use of the flexible wing as an aerodynamic lift surface for various types of vehicles, such as gliders, powered drones, aircraft and wings for the use of recovery of rocket boosters and space capsules, it has become necessary to provide an effective means for controlling such a wing. To date, the principle technique of control for a vehicle having a flexible wing lift surface is to shift the center of gravity of the payload with respect to the flexible wing surface and thereby provide control. Although this type of control is satisfactory to a degree, it has been found to have many disadvantages. With this type of control, the forces required to shift the wing for trim over an appreciable speed range may be large and not have a stable variation with speed. Also, response of the vehicle may be slow due to the shifting of the large load. Furthermore, with the increasing size of vehicles utilizing the flexible wing it has become impractical to shift the relative position of the wing and the vehicle center of gravity due to the weight and complexity of the mechanism necessary to accomplish the shift. It has also been suggested that the flexible wing may be provided with tail surfaces similar to a conventional aircraft. This type of control is workable; however, due to the nature of the flexible wing, this type of control surface is not always feasible. Often, the flexible wing is associated with a payload suspended therebelow, and the control surfaces can be placed on the payload. This arrangement will provide control for the vehicle; however, is not considered per se a flexible wing control. Control may also be achieved by variable-drag devices suitably attached to the payload or wing. With this type of control, it is difficult to have an aerodynamically clean vehicle, and the launch and retrieval of the variable-drag devices is difficult and time consuming. Variable-thrust devices may also be used for control; however, these systems require auxiliary sources of energy or involved structure to tap the main power supply.

The control devices of this invention overcome many of the difficulties inherent in the arrangements mentioned above, by changing the configuration of the flexible wing membrane itself with various techniques or by mechanism associated directly with the wing itself. These structures greatly reduce the control forces required, particularly when compared with the concept of shifting the vehicle center of gravity with respect to the wing. Generally, the control devices described herein may be operated by cables and winding drum structure similar to that in conventional aircraft. Thus, auxiliary power supplies and complicated operating mechanism is not necessary. These controls are also generally applicable to a flexible wing vehicle wherein the payload forms a part of the flexible wing superstructure or where the payload is suspended below the flexible wing. Control response is quicker with the invention controls than with auxiliary type controls such as variable-drag or variable-thrust devices. Also since the various controls are associated directly with the wing surface, the mechanism itself is simpler, more compact, lighter and easier to manufacture and maintain.

It is therefore an object of the present invention to provide a control for a flexible wing vehicle by changing the membrane configuration of the flexible wing.

Still another object of this invention is to provide a control for a flexible wing vehicle which will give rapid vehicle response.

Yet another object of this invention is to provide a control for a flexible wing vehicle which requires minimum control forces.

Another object of this invention is to provide a control for a flexible wing vehicle wherein a portion of the wing superstructure is movable to alter wing membrane configuration.

A further object of this invention is to provide a control for a flexible wing vehicle wherein the wing superstructure may be flexed to change wing membrane configuration.

Still another object of this invention is to provide a control for the flexible wing vehicle wherein an entire element of the wing superstructure is movable to change wing membrane configuration.

Yet another object of the invention is to provide a control for a flexible wing aircraft wherein the wing membrane is gathered to change its configuration.

Another object of the invention is to provide a control for a flexible wing by spoiling the aerodynamic flow over the wing membrane.

A further object of this invention is to provide a control for a flexible wing vehicle which is of simple engineering design, economical to manufacture and maintain and is highly reliable.

Still another object of the invention is to provide a control for a flexible wing vehicle wherein symmetrical variation of the wing membrane provides pitch control and asymmetrical variation of the wing membrane provides roll control.

These and other objects and advantages of the invention will become more apparent upon reading the specification in conjunction with the accompanying drawings.

In the drawings:

FIG. 14 is a perspective view of an airfoil shaped spreader bar shown in FIG. 13;

FIG. 15 is a perspective view of a flexible wing showing a reinforced trailing edge wing membrane with lines attached for deflecting the membrane to change its configuration;

FIG. 16 is a perspective view of a flexible wing having battens secured to the trailing edge of the wing membrane and lines attached to the battens for deflecting on the wing membrane to change its configuration;

FIG. 17 is a perspective view of a flexible wing showing mechanism for spoiling the airflow over the wing membrane to provide control;

FIG. 18 is a cross sectional view taken along the section lines 18—18 of FIG. 17;

FIG. 22 is a perspective view of a flexible wing jointed keel showing mechanism for displacing the jointed portion of the keel;

Basically, this invention relates to control devices for altering the membrane configuration of a flexible wing vehicle. Generally, the flexible wing would include a superstructure of a keel and leading edge member connected to an extremity thereof and projecting at an angle therefrom so as to form an overall triangular wing configuration. A flexible membrane is connected to the leading edge members and keel to form wing panels providing the major lift for the vehicle. When the wing membrane configuration is altered symmetrically, pitch control is provided for the wing and vehicle. However, if the wing membrane configuration is altered asymmetrically, roll control is provided. Various techniques and mechanisms are shown for providing symmetrical and asymmetrical alteration of the wing membrane. These mechanisms and techniques include, as examples, moving a segment of or the entire keel or leading edge members and combined movements thereof, flexing the keel or leading edge members, rolling in portions of the wing membrane, altering the membrane configuration in combination with the use of movable airfoils, and movement of airfoils which form a part of the wing structure.

Figure 1:
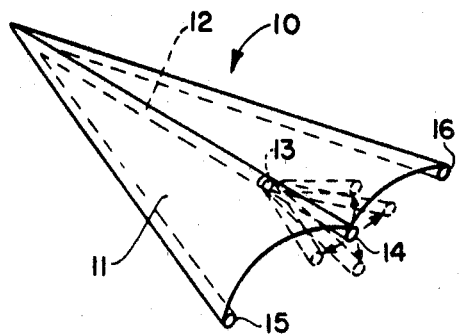
FIG. 1 is a perspective view of a flexible wing showing the keel thereof jointed to provide a control arm for changing wing membrane configuration.

Referring now more specifically to the details of the invention, FIG. 1 shows a perspective view of one flexible wing vehicle and control, designated generally by the reference numeral 10. The vehicle 10 has a flexible wing membrane 11. The membrane 11 may be constructed from various materials, many of the tough, lightweight, commercially available plastics being particularly suited for this purpose as well as some of the high strength cloths now available. Materials, such as wire mesh or screen, may be embedded in the plastics and cloths to provide additional strength to the membrane to the degree that they do not adversely affect its flexible characteristics.

The wing membrane 11 is fixed to a flexible wing superstructure which includes a keel 12 and leading edge members 15 and 16. The leading edge members 15 and 16 are connected to the forward extremity of the keel 12 in a conventional manner and disposed at an angle thereto. The keel and leading edge members may be constructed from various materials such as metal, plastic and/or cloth. Members may also take various configurations such as a one-piece solid construction, tubular members, a truss arrangement with a suitable covering or may be inflatable. They may be designed to be rigid, semirigid or resilient for purposes which will become apparent hereinafter.

The keel 12 is jointed, having a universal joint 13 (shown diagrammatically). The segment of the keel 12 rearward of the universal joint 13 forms a keel control arm 14. As indicated by the arrows the control arm 14 is free to move up and down in the vertical direction and sideways in the horizontal direction. Since the joint 13 is universal, the control arm is actually omnidirectional.

As clearly shown in FIG. 1, the wing membrane 11 is connected to the keel 12 and leading edge members 15 and 16 such that two wing panels are formed. The wing membrane 11 is also connected to the control arm 14. Thus, it is apparent that upon raising and lowering the keel control arm, the membrane configuration will be altered symmetrically wherein movement of the control arm from side to side will alter the membrane asymmetrically, the former movement providing pitch control and the latter movement roll or directional control.

Figure 2:
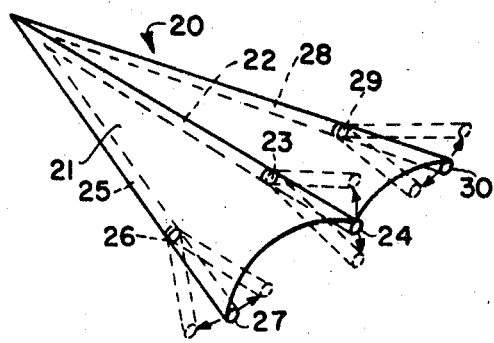
FIG. 2 is a perspective view of a flexible wing showing the keel and leading edge members thereof jointed to provide control arms, the keel control arm being movable in the vertical direction and the leading edge members in the horizontal direction to change wing membrane configuration.

The flexible wing 20 (FIG. 2) is basically similar in construction to the wing 10 having a flexible wing membrane 21 which is connected to a keel 22 and leading edge members 25 and 28. Wing 20 differs from wing 10 in that keel 22 is hinged at 23 to provide a keel control arm 24 movable in the vertical direction. Leading edge member 25 is hinged at 26 to form a leading edge control arm 27 movable in the horizontal direction. Leading edge member 28 is also hinged to form a leading edge control arm 30 movable in the horizontal direction. Thus, in vehicle 20 pitch control is provided by movement of the keel control arm 24 whereas roll control is provided by asymmetrical movement of the leading edge control members 27 and 30.

Figure 3:
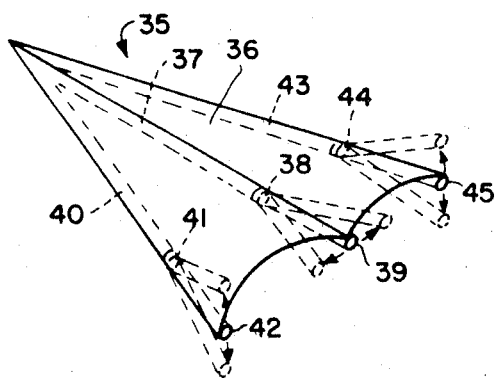
FIG. 3 is a perspective view of a flexible wing as in FIG. 2; however, the keel control arm is movable in the horizontal direction and the leading edge control arms in the vertical direction.

FIG. 3 shows a flexible wing 35 which is similar to the flexible wing 20 except, that the leading edge control arms and keel control arm movement is reversed. The flexible wing membrane 36 is fixed to the keel 37 and leading edge members 40 and 43. A hinge 38 connects the keel control arm 39 to the keel 37, the keel control arm 39 being movable in the horizontal direction. A hinge 41 connects the leading edge control arm 42 to the leading edge 40, the leading edge control arm being movable in the vertical direction. Hinge 44 connects leading edge control arm 45 to the leading edge 43, the control arm 45 moving in the same manner as the control arm 42. Pitch control in this embodiment is provided by raising or lowering the leading edge control arms 42 and 45 together. Roll control is accomplished by movement of the control arm 39.

Figure 4:
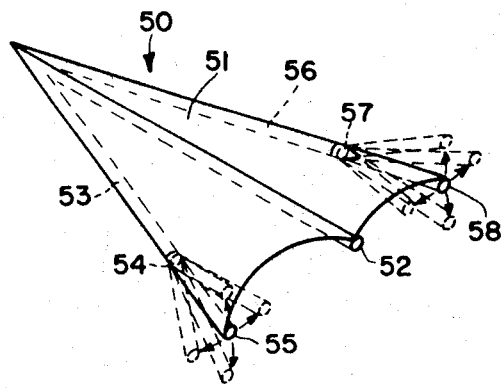
FIG. 4 is a perspective view of a flexible wing showing the leading edge members jointed to provide leading edge control arms which are movable both in the horizontal and vertical direction to alter wing membrane configuration.

The vehicle 50 (FIG. 4) is also basically similar to the above described flexible wings. It has a flexible wing membrane 51 which is fixed to the wing superstructure including a keel 52 and leading edge members 53 and 56. The universal joint 54 connects the leading edge control arm 55 to the remainder of the leading edge structure 53. Leading edge member 56 has a universal joint 57 which connects leading edge control arm 58. Pitch control of flexible wing 50 is determined by simultaneous symmetrical movement of the leading edge control arms 55 and 58 whereas roll control is determined by simultaneous asymmetrical movement of the leading edge control arms. Although not shown, it is to be understood that it is within the broadest aspect of the invention to provide a flexible wing wherein the keel as well as the leading edge members are universally jointed, and pitch control provided by raising and lowering all members simultaneously and roll control by moving all the members asymmetrically at the same time.

Figure 5:
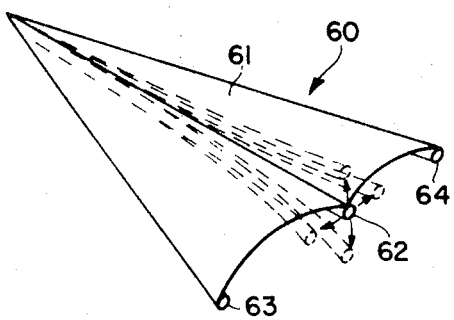
FIG. 5 is a perspective view of a flexible wing vehicle wherein the keel is a resilient member and may be bent to alter wing membrane configuration.

FIG. 5 shows a flexible wing 60 wherein the flexible wing membrane 61 is connected to a keel 62 and leading edge members 63 and 64. In this embodiment the keel 62 itself is flexible and resilient. As is shown by the arrows, application of a force to the trailing edge of the keel causes it to bend and thereby alter the configuration of the flexible membrane 61 which is attached thereto. Vertical movement of the keel 62 will provide pitch control and movement from side to side roll control.

Figure 6:
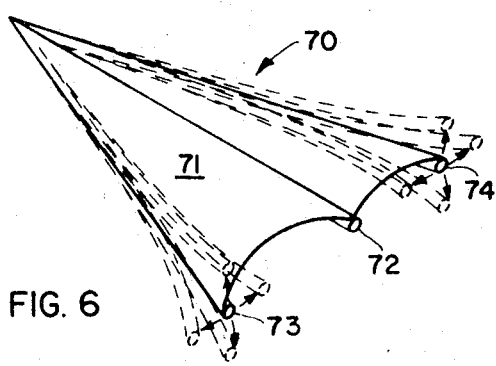
FIG. 6 is a perspective view of a flexible wing having resilient leading edge members which may be bent to change wing membrane configuration.
Figure 7:
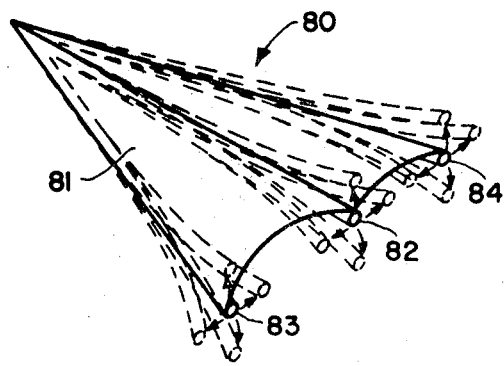
FIG. 7 is a perspective view of a flexible wing showing resilient keel and leading edge members which may be bent to change wing membrane configuration.

The vehicle 70 is similar to the vehicle 60 except that the leading edge members are flexible and resilient rather than the keel. The flexible wing membrane 71 is fixed to the keel 72 and leading edge members 73 and 74. As clearly illustrated by the arrows in FIG. 6, application of a force to the leading edge members bend them in the direction desired to provide pitch and roll control.

The flexible wing 80 shows an arrangement whereby both the leading edge members and the keel are flexible and resilient members. The flexible wing material 81 is fixed to the keel 82 and to the leading edge members 83 and 84 as in the previous embodiments. Application of a symmetrical force to the leading edge members and the keel 82 will alter the membrane configuration to provide pitch control whereas asymmetrical movement of the members will result in roll control. Although not shown, it is clear that the flexible wing 80 may be controlled by a combination of movements of the leading edge members and keel wherein the keel is moved in one direction, the leading edge members in a perpendicular direction, and vice versa, to accomplish pitch and roll control.

Figure 8:
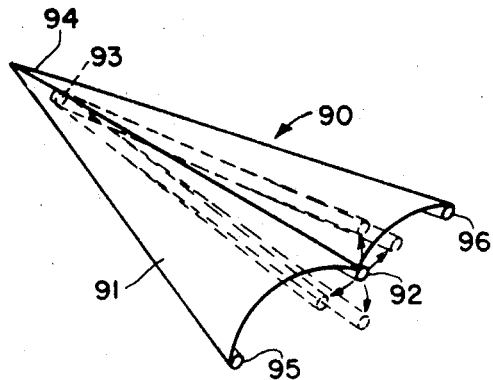
FIG. 8 is a perspective view of a flexible wing showing the keel hinged at the apex, substantially all of the keel being movable to change wing membrane configuration.

FIG. 8 shows a flexible wing 90 wherein the keel is jointed at the apex of the wing. The wing 90 has a flexible wing membrane 91 which is secured to the keel 92 and to the leading edge members 95 and 96 as in previous embodiments. A universal joint 93 connects the keel 92 to the nose 94 of the wing. It is readily apparent in this embodiment that substantially all of the keel is movable to alter the membrane configuration and provide control. The keel 92 is free to move at least vertically and horizontally to give symmetrical and asymmetrical displacement of the wing membrane 91.

Figure 9:
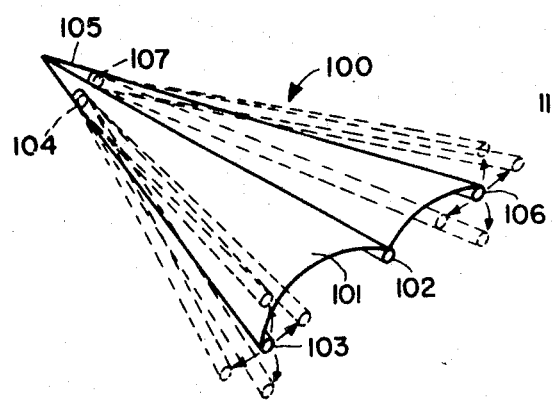
FIG. 9 is a perspective view of a flexible wing wherein the leading edge members are hinged to the apex, these members being movable to change wing membrane configuration.

FIG. 9 shows a flexible wing 100 which is similar to the wing 90 except that in this arrangement the leading edge members are jointed rather than the keel. Flexible wing membrane 101 is fastened to the keel 102 and the leading edge members 103 and 106. Universal joint 104 (shown diagrammatically) connects the leading edge member 103 to the nose 105. Universal joint 107 connects leading edge member 106 to the nose 105. Thus, the leading edge members 103 and 106 are free to move vertically and horizontally as illustrated by the arrows.

Figure 10:
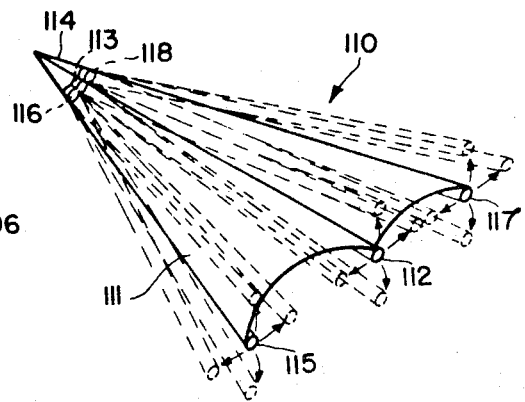
FIG. 10 is a perspective view of a flexible wing wherein the keel and leading edge members both are hinged to the apex, these members being movable to change wing membrane configuration.

The flexible wing 110 has its keel as well as the leading edge members jointed at the apex of the wing. The flexible wing membrane 111 is fixed to the keel 112 and to the leading edge members 115 and 117. Universal joint 113 connects to keel 112 to the nose 114, universal joint 116 connects the leading edge member 115 to the nose 114 and universal joint 118 connects the leading edge member 117 to the nose 114. Symmetrical movement of the keel 112 and/or the leading edge members 115 and 117 results in pitch control whereas asymmetrical movement of the members results in roll control. From the illustration of FIG. 10, it is apparent that the keel 112 may be hinged only for vertical movement and the leading edge members for sideways movement and vice versa to form a combination of directional movements for control of the wing.

Figure 11:
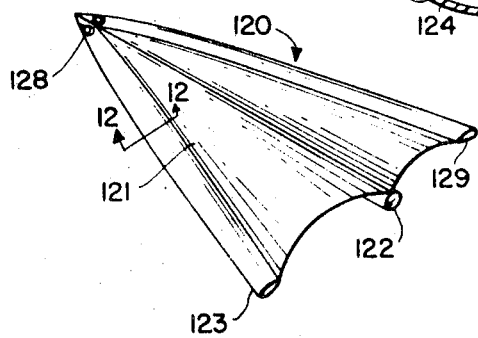
FIG. 11 is a perspective view of a flexible wing wherein the leading edge members are airfoil shaped and pivotally connected to the apex of the vehicle, the leading edge members upon being twisted themselves providing control as well as changing wing membrane configuration for control.

The flexible wing 120, shown in FIG. 11, has a flexible wing membrane 121 which is fixed to a keel 122 and to the top or face of leading edge members 123 and 129. The leading edge members 123 and 129 are rather flat, oblate-shaped members designed such that they may operate as airfoils. These members have a universal connection 128 at the apex of the wing 120 such that they are free to twist.

Figure 12:
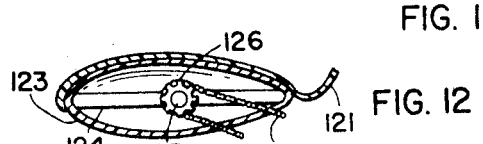
FIG. 12 is a cross sectional view taken along the section lines 12—12 of FIG. 11.

FIG. 12 shows a cross sectional view of the airfoil 23 and the structure housed therein which may be utilized to twist or rotate a leading edge member. This structure includes a sprocket 126 which is fixed to a shaft 125. The shaft 125 extends a partial distance along the longitudinal length of the airfoil 123 and is in turn fixed to spars 124 positioned at spaced intervals therealong and anchored to the airfoil structure 123. A chain 127 is engaged with the sprocket 126 and upon movement thereof by conventional power means (not shown) located in the keel, the leading edge member 123 is twisted. Similar structure is provided in the leading edge member 129 to twist it. By twisting the leading edge members 123 and 129, it is apparent that due to their airfoil shape a change in their position will affect control of the wing. Furthermore, as the leading edge members are twisted, the configuration of the membrane is altered to also provide control. Thus, rotating both of the leading edge members, clockwise or counterclockwise, about an imaginary axis running through the longitudinal extent thereof would result in roll control whereas rotating one of the leading edge members clockwise and the other counterclockwise would result in pitch control.

Figure 13:
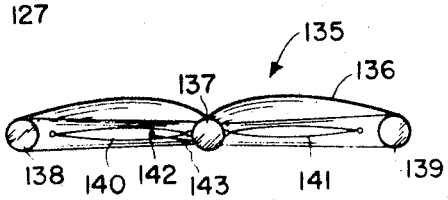
FIG. 13 is an end view of a flexible wing showing airfoil shaped spreader bars for control of the wing.

FIG. 13 shows an end view of a flexible wing 135 as it would appear flying away from the viewer. The vehicle 135 has a flexible membrane wing 136 which is secured to a keel 137 and leading edge members 138 and 139. Located below the trailing edge of the membrane 136 and adjacent the rearward extremities of the keel 137 and leading edge members 138 and 139 are spreader bar flaps 140 and 141. These flaps are generally airfoil shaped as shown in FIG. 14. The flap 140 is rotatably mounted between the keel 137 and leading edge member 138, and flap 141 between keel 137 and leading edge member 139. These flaps operate similar to the flaps on a conventional airplane wherein simultaneous symmetrical movement provides pitch control and asymmetrical movement provides roll control. A leg 142 may be fixed to the underside of the spreader bar flap and project therebelow, the leg being connected by a bar 143 to a bell crank (not shown)

to rotate the flap. A similar arrangement may be utilized to rotate the flap 141. The spreader bar flaps 140 and 141 operate not only as control members but also as a structural member to space the trailing edge extremities of the leading edge members 138 and 139 from the keel 137. When a payload is suspended below the flexible wing, the load tends to draw the leading edge members toward the keel. The spreader bar flaps thus operate to properly space the superstructure members and maintain vehicle integrity as well as to control the wing.

The flexible wing embodiment 150, shown in FIG. 15, has a flexible membrane wing 151 which is fixed to a keel 154 and to leading edge members 155 and 156. Embedded in the trailing edge of the wing membrane 151 are reinforcement strips or elements 153 and 154. These elements may be in the form of a rope, wire, flexible strip or possibly the trailing edge of the membrane folded upon itself several times and secured in this position. This reinforcement is provided so that control lines 157 and 158 can be attached to the trailing edge of the wing membrane. Control line 157 is fixed to the reinforcement 153 and the control line 158 to the reinforcement 154. Control in this flexible wing is obtained by merely pulling on the control lines symmetrically for pitch and asymmetrically for roll. Force can be applied to the lines 157 and 158 by conventional structure such as a winding drum or leverage system (not shown).

Control of the flexible wing 160 is also accomplished by deflecting the trailing edge. Wing 160 has a flexible membrane 161 which is connected to a keel 164 and leading edge members 165 and 166. Embedded in the wing membrane 161 are battens 162 and 163. The battens 162 are in one panel of the wing and battens 163 are in the other. The battens are resilient strips which may be set such that their trailing edge extremities are curved upward to form a reflexed trailing edge in the membrane.

Control lines 167 are fixed to the battens 162 and control line 168 to the battens 163. As in the flexible wing 150, force applied symmetrically to the control lines 167 and 168 will change the wing membrane configuration so as to give pitch control whereas asymmetrical deflection will give roll control. Due to the inherent resiliency of the battens 162 and 163 the trailing edge of the wing membrane will return to its straight or reflexed trailing edge configuration upon completion of the control maneuver. Force may be applied to the deflection lines by conventional mechanism such as winding drums or leverage system (not shown).

FIGS. 17 and 18 show a flexible wing arrangement 170 wherein control is accomplished by spoiling the areodynamic flow over the wing. The wing 170 has a flexible wing membrane 171 which is fixed to the keel 178 and leading edge members 179 and 180 as in previous embodiments. The left wing panel as shown in FIG. 17 has a series of mesh-covered or embedded holes or apertures 172 formed therethrough. Flaps 173 are fixed to the underside of the membrane and located such that they may cover the apertures as shown in FIG. 17 or open them as shown in FIG. 18. A drawstring 174 is fixed to the flaps 173 and when drawn will uncover the apertures 172. The other wing panel has a similar arrangement with apertures 175, flaps 176 and a drawstring 177. When there is little or no tension on the drawstrings 174 and 177, the airstream against the flaps will cause them to cover the apertures. However, when the flaps are drawn, the airstream passes through the apertures spoiling the normal aerodynamic flow thereby decreasing the lift of the wing. It should be noted that the flaps also tend to operate as scoops to force the air through the apertures. A pitching action can be accomplished by uncovering apertures 172 and 175 simultaneously, and roll control by uncovering one or the other of the series of apertures depending upon the direction desired.

Although only one series of apertures are shown in each wing panel, it is to be understood that more apertures may be provided. Also, the size of the apertures may vary and the flaps operated such that the apertures are uncovered individually rather than in a series as shown. Obviously, the apertures may be placed at various positions in the wing membrane to accomplish the most desirable control result.

Figure 19:
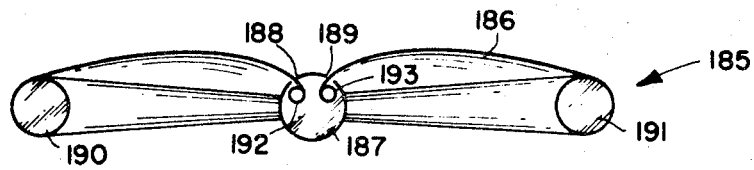
FIG. 19 is an end view of a flexible wing showing mechanism in the keel for rolling up the membrane to change its configuration.

An end view of a flexible wing 185 is shown in FIG. 19. The flexible wing 185 has a flexible wing membrane 186 which is fixed to the leading edge members 190 and 191 as in previous embodiments. The keel 187 is fixed to the leading edge members, also as in previous embodiments, but includes longitudinal slots 188 and 189 which extend throughout substantially the entire length of the keel. Journaled in the keel 187 are the membrane rollers 192 and 193. One side of the wing membrane 186 passes through the slot 188 and is secured to the membrane roller 192. The other side of the wing membrane passes through the slot 189 and is fixed to the membrane roller 193. By a suitable gear train and power source (not shown) the rollers 192 and 193 are rotated to roll the wing membrane into the keel. It is apparent from FIG. 19 that when the membrane rolls are rotated in the opposite direction, the wing membrane is symmetrically taken into or let out of the keel providing for pitch control. When the membrane rollers are rotated in the same direction, one portion thereof is taken in whereas the other is played out, depending upon the direction of rotation, providing for roll control of the vehicle.

Figure 20:
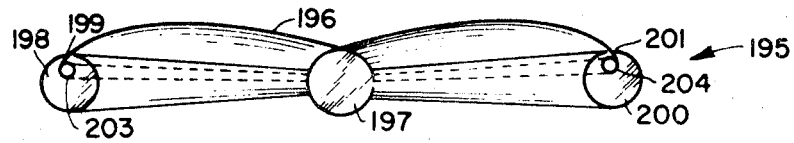
FIG. 20 is an end view of a flexible wing showing mechanism in the leading edges for rolling up the wing membrane to change its configuration.

FIG. 20 shows a flexible wing 195 which is similar to the flexible wing 185 except that the rollers are located in the leading edge members rather than in the keel. The flexible membrane 196 is thus fixed to the keel 197 and the other edges thereof to rollers 203 and 204 journaled in the leading edge members 197 and 200. The leading edge member 203 is provided with a slot 199 and the leading edge member 200 with a slot 201 to receive the wing membrane. The membrane rollers 203 and 204 are also rotated by a conventional gear train and power source (not shown). The membrane rollers 203 and 204 are tapered toward the apex of the flexible wing to compensate for the generally triangular shape of the wing membrane. Opposite rotation of the membrane rollers will result in simultaneously taking in the wing membrane 196, and rotation in the same direction will take in one section and play out in the other as in the previous embodiment.

Figure 21:
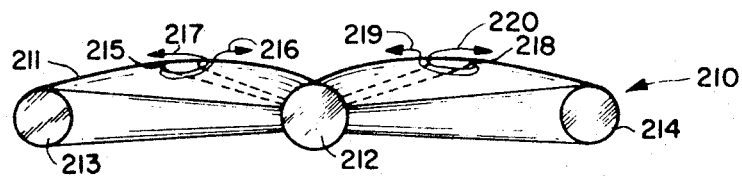
FIG. 21 is an end view of a flexible wing showing a slat secured to the wing membrane which may be flipped to roll up the membrane and change its configuration.

The flexible wing 210, shown in FIG. 21, is also controlled by the technique of rolling or gathering the flexible membrane to change the configuration thereof; however, the rolling is accomplished by structure placed within the flexible membrane itself. The flexible wing membrane 211 is fixed to the keel 212 and to the leading edge members 213 and 214 as previously described. A slat 215 is secured to the flexible membrane 211 midway between the keel 212 and leading edge member 213, and extends to a position adjacent the apex of the wing. A slat 218 is similarly located between the keel 212 and leading edge member 214. A flip cord 216 is fixed to the edge of the slot 215 nearest the leading edge member 213 and a flip cord 217 secured to the edge of the slat nearest the keel 212. Flip cords 219 and 220 are similarly attached to the slat 218. Viewing FIG. 21, it is believed clear that when the cords are pulled on from opposite directions, as indicated by the arrows, the slat will flip or rotate and roll or gather the attached portion of the wing membrane 211 with it thereby changing the configuration of the wing. Both slats are flipped at the same time to provide for pitch control, and one or the other flipped to provide roll control depending upon the direction of movement. Although one slat is shown in each wing panel, it is to be understood that more may be added if necessary to increase the degree of control maneuver. The flip cords may be drawn by winding drums or linkage (not shown) located in the keel and leading edge members.

FIG. 22 shows a perspective view of an operator shown in conjunction with a portion of the flexible wing 10. It should be understood, however, that it is believed readily within the skill of the artisan to adopt this operator to use with the flexible wings 20, 35, 50, 60, 70, 80, 90, 100, and 110. The operator consists of horns 225, 226, 227, and 228 fixed at 90 degree intervals about the keel control arm 14. The horns 225 and 227 would be located in an imaginary vertical plane passing through the keel 14 and the horns 226 and 228 in an imaginary horizontal plane passing through the keel 14. Cables 230, 231, 232, and 233 are connected respectively to the horns 225–228. These cables are connected respectively to winding drum motor combinations 234, 235, 236, and 237. The winding drum motor elements 234 through 237 may be placed well forward on the wing or the cables entrained over appropriately placed pulleys (not shown) and connected with the winding drum motor elements which may be located in a payload suspended under the flexible wing. It should also be understood that the cables may be drawn manually by attaching them to conventional mechanism, for example, such as a joy stick. When the cable 230 is shortened by operation of the winding drum motor element 234, it is believed clear from FIG. 22 that the control arm 14 will be moved up. Shortening of cable 232 by winding drum motor element 236 moves the control arm downward. Shortening of cable 231 and lengthening of cable 233 causes the arm to move to the right as viewed in FIG. 22, and the reverse movement of the cables causes the control arm to move to the left.

Figure 23:
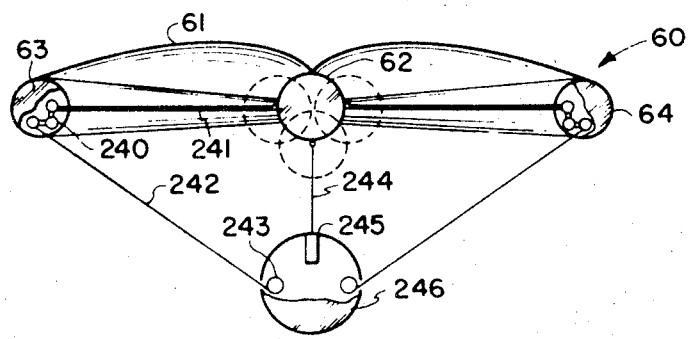
FIG. 23 is an end view of a flexible wing having a suspended payload showing mechanism for displacing the keel or a portion thereof.

The operator shown in FIG. 23 is shown associated with the flexible wing 60 and is drawn to show the essential parts of the operator and not the details of the flexible wing vehicle. This operator is designed primarily for use with a flexible wing wherein the keel or a portion thereof is moved to control the flexible wing. Thus, the control may also be associated with an arrangement such as shown in flexible wing 10 and 90. The operator includes a bell crank 240 which is journaled in or on the leading edge member 63. A link 241 is pivotally connected to one arm of the bell crank 240 and to the keel 62. A cable 242 is connected to the other arm of bell crank 240 and to a winding spindle 243 journaled in a payload 246 suspended below the flexible wing. A pushrod 244 is pivotally connected to the keel 62 and to an actuator 245 housed within the payload 246. Movement of the keel 62 from side to side is accomplished by shortening the cable 242 with the winding spindle 243. This causes the bell crank to rotate about its pivot point and move the link 241 and keel 62 connected thereto, to the left as viewed in FIG. 23. A similar linkage system is shown to move the keel 62 to the right as viewed in FIG. 23. Energization of the actuator 145 will move the keel 62 downwardly through the pushrod 244. The actuator 245 may be of the double-acting type such that the keel may be moved both upward and downward, if desired.

Figure 24:
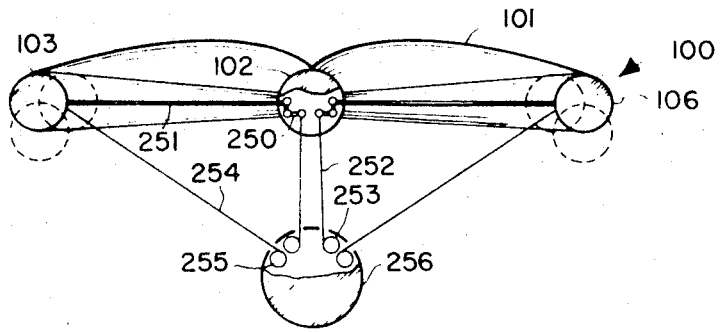
FIG. 24 is an end view of a flexible wing with a suspended payload showing mechanism for moving leading edge members or a portion thereof.

The operator shown in FIG. 24 is illustrated in conjunction with flexible wing 100; however, it may also be utilized with an arrangement such as the flexible wing 50 and 70. FIG. 24 is drawn as FIG. 23 to show only the operator and not the details of the flexible wing vehicle. In both instances, it is to be understood that the components of the flexible wing vehicle are fixed relatively to assure proper operation of the linkage systems. This operator is designed primarily for use with a flexible wing wherein the leading edge members or a portion thereof are movable to provide control. This operator includes a bell crank 250 which is journaled in or on the keel 102. One arm of the bell crank is pivotally connected to a link 252 which is in turn connected to the leading edge member 103. The other arm of the bell crank 250 is connected to a cable 251 which is fixed to a winding spool 253 journaled in the payload 256 suspended below the wing. A cable 254 is fixed to the leading edge member 103 and to a winding spool 255 also journaled in the payload 256.

When the cable 252 is shortened by the winding spool 253, the bell crank 250 is caused to pivot and draw the leading edge member 103 in toward the keel 102 thus changing the configuration of the flexible wing membrane 101. When the cable 254 is shortened by winding spool 255 the leading edge member 103 is drawn downward. Similar linkage and cable structure is provided to move the leading edge member 106 in a horizontal plane and substantially a vertical plane.

OPERATION

From the above description, the operation of the various control devices for the flexible wing is believed readily understood. The flexible wing 10 is controlled by the control arm 14 which may be moved by structure such as shown in FIG. 22. Vertical movement of the keel control arm 14 results in symmetrical displacement of the wing membrane 11 providing for pitch control. Movement of the keel control arm 14 from side to side results in asymmetrical displacement of the wing membrane and roll control. Generally, symmetrical and asymmetrical displacement of the wing membrane in the flexible wings 20, 35, 50, 60, 70, 80, 90, 100, 110, 120, 150, 160, 185, 195, and 210 result in pitch and roll control in a manner similar to that just described. Although the techniques and mechanisms may vary for displacement of the wing membrane, the results are essentially the same.

Although the operators shown in FIGS. 22–24 are shown associated with specific embodiments of the invention, it should be understood that it is believed within the scope of the invention to use these operators with other embodiments as shown or in combination. For example, the operator shown in FIG. 22 might be utilized to move the keel control arm 24 in flexible wing 20 by using only the horns 225 and 227 with associated cable and winding mechanism. The bell crank operators shown in FIG. 24 might be utilized to operate the leading edge control arms 27 and 30 in flexible wing 20. Powered winding drums and linkages are shown or suggested as being associated with the various controls and operators; however, it should be understood that they can be operated manually.

It should be also pointed out that it is believed within the scope of the invention to combine the controls of the various flexible wing control devices shown to accomplish control of the vehicle. For instance, it may be found desirable to utilize the keel control arm 39 as shown in flexible wing 35 in combination with the hinged leading edge members 103 and 106 as shown in flexible wing 100. Likewise, it might be desirable to utilize the airfoil-shaped leading edge members 123 and 129 in flexible wing 120 for pitch control and the wing membrane aperture arrangement for roll control as shown in FIG. 17. Obviously, many combinations of the flexible wings shown are believed readily apparent from the above examples and are considered included in the invention.

From the above description, it is believed clear that the flexible wing control arrangements described herein provide new and useful arrangements for the control of flexible wings. The various controls described and illustrated are directly associated with the wing per se and are not extraneous control arrangements such as shifting the center of gravity of the payload or variable thrust and drag devices. Therefore, the controls are simpler than existing arrangements, more economical to manufacture, easier to operate and maintain, and provide a more effective manner of control. The forces required to operate the controls are less and the controls are more responsive being directly associated with the flexible wing. Thus, control is quicker and more positive. The control devices are adaptable to vehicle configurations wherein the payload forms a part of the flexible wing superstructure or where the payload is suspended below the flexible wing. Control is accomplished by displacement of the flexible wing membrane itself, thus eliminating the necessity of extraneous control surfaces such as normally appear on conventional aircraft having a rigid airframe.

What is claimed as new and desired to be secured by Letters Patent of the United States is:

1. A control for a device capable of flight comprising: a flight vehicle, said vehicle having a flexible wing; the wing including a keel and leading edge members; a membrane-like material fixed to said keel and said leading edge members so as to form a wing panel on either side of said keel constituting a lift surface; said leading edge members being universally jointed at the apex to said keel for movement in various directions thereabout, and means to move said leading edge members from a neutral position and thereby displace said membrane-like material symmetrically for pitch control and asymmetrically for roll control.

2. A control for a device capable of flight as in claim 1 wherein said leading edge members are jointed at the apex of the keel forming a generally triangular configuration; a flexible material fixed to said keel and leading edge members forming a wing panel on either side of said keel; levers mounted in said keel; links pivotally connected to said leading edge members and to said levers; means to operate said levers to move said leading edge members in a direction to displace said flexible material asymmetrically for roll control; and actuator means operating through cables to move said leading edge members in another direction to displace said flexible material symmetrically for pitch control.

3. A control for a device capable of flight as in claim 2 wherein substantially all of each leading edge member is movable.

References Cited

UNITED STATES PATENTS

| | | | |
|---|---|---|---|
| 989,786 | 4/1911 | Lee et al. | 244—35 |
| 3,152,778 | 10/1964 | Girard | 244—46 |
| 3,140,842 | 7/1964 | Craigo et al. | 244—46 |

MILTON BUCHLER, *Primary Examiner.*

RICHARD A. DORNON, *Assistant Examiner.*

U.S. Cl. X.R.

244—138